United States Patent [19]

Yamamura et al.

[11] Patent Number: 5,316,571
[45] Date of Patent: May 31, 1994

[54] ALUMINA-SPINEL TYPE MONOLITHIC REFRACTORIES

[75] Inventors: Takashi Yamamura; Yoshihisa Hamazaki, both of Okayama; Toshihiko Kaneshige; Makoto Nanba, both of Bizen; Yukitoshi Kubota, Akaiwa, all of Japan

[73] Assignee: Shinagawa Refractories Co., Ltd., Tokyo, Japan

[21] Appl. No.: 927,266

[22] PCT Filed: Nov. 7, 1991

[86] PCT No.: PCT/JP91/01528

§ 371 Date: Sep. 23, 1992

§ 102(e) Date: Sep. 23, 1992

[87] PCT Pub. No.: WO92/18440

PCT Pub. Date: Oct. 29, 1992

[30] Foreign Application Priority Data

Apr. 16, 1991 [JP] Japan ................................. 3-84121

[51] Int. Cl.$^5$ .................... C04B 28/06; C04B 35/44
[52] U.S. Cl. ...................................... 106/692; 501/120
[58] Field of Search ..................... 501/120; 106/692

[56] References Cited

U.S. PATENT DOCUMENTS 4,780,434 10/1988 Watanabe et al. .................. 501/120
4,990,475 2/1991 Matsumoto et al. ............... 501/120
5,135,896 8/1992 Vezza ................................. 501/120

FOREIGN PATENT DOCUMENTS 0006713 1/1977 Japan.
55-23004 2/1980 Japan.
0085478 6/1980 Japan.
59-128271 7/1984 Japan.
60-60985 4/1985 Japan.
64-87577 3/1989 Japan.
2-221165 9/1990 Japan.

OTHER PUBLICATIONS

Database WPIL, AN 84-217067, JP-A-59 128 271, Jul. 24, 1984.
Patent Abstracts of Japan, vol. 15, No. 474 (C-890), Dec. 3, 1991, JP-A-32 05 368, Sep. 6, 1991.

Primary Examiner—Mark L. Bell
Assistant Examiner—David R. Sample
Attorney, Agent, or Firm—Oblon, Spivak, McClelland, Maier & Neustadt

[57] ABSTRACT

Alumina-spinel monolithic refractory having excellent spalling resistance, corrosion resistance and slag penetration resistance. The alumina-spinel refractory contains an alumina-spinel clinker having a MgO:Al$_2$O$_3$ molar ratio ranging from 0.14:1.86 to 0.6:1.4 which can be simultaneously used with a spinel clinker having a close to theoretical composition with the balance consisting of an alumina material and alumina cement. Also, in order to inhibit the elongation of cracks an alumina crushed grain having a grain size ranging from 10 to 50 mm can be added to the alumina-spinel monolithic refractory.

5 Claims, 1 Drawing Sheet

ALUMINA-SPINEL TYPE MONOLITHIC REFRACTORIES

INDUSTRIAL FIELD OF USE

This invention relates to alumina-spinel type monolithic refractories having excellent spalling resistance, corrosion resistance and slag penetration resistance.

PRIOR ART

In recent years, the conditions for using lining refractories for ladles have become severe because of diversification of the steel making process, i.e. ① a rise in continuous casting ratio and an increase in degasification ratio; ② the introduction of ladle refining; and ③ a rise of tapping temperatures accompanying transportation of molten steel, extension of holding time of molten steel, agitation of molten steel and like.

In the past, lining refractories for ladles were based on Roseki and/or zircon refractories, but high-alumina refractories are now being used as refractories having a low silica content not only because of said diversification in the steel making process, but also because of strong demand for high quality steel. Also, even though basic materials such as magnesia refractories and the like were partially investigated, said materials never became practical, because of a great deal of cracking and peeling owing to thermal and structural spalling.

Compared with Roseki and zircon refractories, high-alumina refractories have the following disadvantages: (a) slag penetration is great, (b) spalling resistance is inferior.

As processes inhibiting slag penetration of high-alumina refractories, alumina-spinel type, alumina-spinel-magnesia type or alumina-magnesia type castable refractories that are combined with $MgO\text{-}Al_2O_3$ type spinel and/or magnesia were proposed in Japanese Patent Laid-Open Nos. 55-23004, 59-128271, 60-60985 and 64-87577.

In more detail, Japanese Patent Laid-Open No. 55-23004 described a material comprising from 10 to 85 percent by weight of a spinel clinker having a theoretical composition with a $MgO:Al_2O_3$ molar ratio of 1:1, from 5 to 30 percent by weight of an alumina and from 10 to 25 percent by weight of a high-alumina cement; Japanese Patent Laid-Open No. 59-128271 described a material comprising from 50 to 95 percent by weight of a spinel having an approximate theoretical composition with a $MgO:Al_2O_3$ molar ratio of from 0.8:1.2 to 1.1:0.9 and the balance being substantially $Al_2O_3$; Japanese Patent Laid-Open No. 60-60985 described a material comprising at least 60 parts by weight of a spinel clinker having a theoretical composition, from 10 to 35 parts by weight of an alumina clinker and from 3 to 10 parts by weight of an alumina cement. Also, Japanese Patent Laid-Open No. 64-87577 described a material having good slag penetration resistance comprised of from 5 to 40 percent by weight of a spinel having an approximate theoretical composition with a $MgO:Al_2O_3$ molar ratio of from 0.7:1.3 to 1.3:0.7, from 50 to 90 percent by weight of an alumina clinker and from 3 to 25 percent by weight of an alumina cement.

PROBLEMS THE INVENTION AIMS TO SOLVE

However, although it was found that if spinel or magnesia is added to said materials, the structural spalling and corrosion resistance in said materials are improved by inhibiting slag penetration in comparison with conventional high-alumina refractories, their effect in regards to slag penetration is less than that of Roseki and zircon refractories.

For example when a conventional spinel clinker with a $MgO:Al_2O_3$ molar ratio close to the theoretical composition is used alone in an alumina-spinel type monolithic refractory as can be seen from the results shown in FIG. 2 of the corrosion test of an alumina-spinel type monolithic refractory using sintered spinel A having an almost theoretical composition with a $MgO:Al_2O_3$ molar ratio of 1.02:0.98, there is a problem when the spinel clinker passes 40 percent in that it becomes easier for structural spalling to occur, because the slag penetration become large, even though corrosion resistance is increased.

Also, there have been various reports concerning the mechanism of inhibiting slag penetration and they describe that the effect of the addition of spinel clinker inhibits slag penetration by dissolving FeO and MnO components in the slag into the spinel clinker.

However, if the FeO and MnO components dissolve to produce a solid solution in the spinel, the lattice constant of the spinel increases, since the ionic radii of both Fe and Mn ions are greater than those of Mg ions and the slack in the texture occurs due to the expanding monolithic refractories. As the result, slag peretration was accelerated. Therefore in order to inhibit spinel slag penetration, alumina-spinel type monolithic refractories using alumina and spinel have been proposed, but at the present time, refractories having satisfactory properties have not yet been developed.

Accordingly, the development of the monolithic refractories having even lower slag penetration is desirable.

MEANS FOR SOLVING THE PERTINENT PROBLEM

In view of said problem, the present inventors noticed the $MgO:Al_2O_3$ molar ratio of spinel clinker and carried out various experiments, as the result of which it was found that the slag penetration of alumina-spinel type monolithic refractories using spinel clinker having from 0.14:1.86 to 0.6:1.4 of $MgO:Al_2O_3$ molar ratio is notably lower than that of prior art monolithic refractories using alumina material and spinel clinker having larger than 0.6:1.4 of $MgO:Al_2O_3$ molar ratio, to complete the present invention.

The first embodiment of the alumina-spinel type monolithic refractory according to the present invention is characterized in that said refractory contains from 80 to 92 percent by weight of alumina-spinel type clinker having a $MgO:Al_2O_3$ molar ratio within 0.14:1.86 to 0.6:1.4 and from 8 to 20 percent by weight of alumina cement.

The second embodiment of the alumina-spinel type monolithic refractory according to the present invention is characterized in that said refractory contains from 5 to 92 percent by weight of alumina-spinel type clinker having a $MgO:Al_2O_3$ molar ratio within 0.14:1.86 to 0.6:1.4, not more than 87 percent by weight of alumina material and from 8 to 20 percent by weight of alumina cement.

The third embodiment of the alumina-spinel type monolithic refractory according to the present invention is characterized in that said refractory contains 100 parts by weight of the mixture comprising from 5 to 92 percent by weight of alumina-spinel type clinker having a MgO:Al$_2$O$_3$ molar ratio within 0.14:1.86 to 0.6:1.4, not more than 87 percent by weight of alumina material and from 8 to 20 percent by weight of alumina cement, and from 10 to 40 parts by weight of alumina crushed grain having a grain size of from 10 to 50 mm.

Further, as for alumina-spinel type monolithic refractories using only alumina-spinel type clinker having a MgO:Al$_2$O$_3$ molar ratio within 0.14:1.86 to 0.6:1.4 as described above, it is clear from the results of a corrosion test of the material using only alumina-spinel type clinker having a MgO:Al$_2$O$_3$ molar ratio of 0.44:1.56 as shown as one example in FIG. 3 that although excellent slag penetration resistance is obtained by said refractories, it was found that there is a problem in that the corrosion resistance of said refractories is slightly inferior to that using MgO-Al$_2$O$_3$ type spinel clinker having a theoretical composition.

Accordingly, we found that in order to improve the durability of alumina-spinel type monolithic refractories during more severe service conditions if an alumina-spinel type clinker having a MgO:Al$_2$O$_3$ molar ratio within from 0.14:1.86 to 0.6:1.4 as described above and conventional spinel clinker having a close to theoretical composition are used together and blended at proper grain size and proper quantity, the refractories obtained have excellent slag penetrating resistance and the corrosion resistance can be significantly improved.

Accordingly, the fourth embodiment of the alumina-spinel type monolithic refractory according to the present invention is characterized in that said refractory contains from 10 to 40 percent by weight of spinel clinker having a MgO:Al$_2$O$_3$ molar ratio within 0.9:1.1 to 1.3:0.7 and a grain size of not more than 1 mm, from 30 to 82 percent by weight of alumina-spinel clinker having a MgO:Al$_2$O$_3$ molar ratio within 0.14:1.86 to 0.6:1.4 and from 8 to 20 percent by weight of alumina cement.

Also, the fifth embodiment of the alumina-spinel type monolithic refractory according to the present invention is characterized in that said refractory contains from 10 to 40 percent by weight of spinel clinker having a MgO:Al$_2$O$_3$ molar ratio within 0.9:1.1 to 1.3:0.7 and a grain size of not more than 1 mm, from 30 to 82 percent by weight of alumina-spinel clinker having a MgO:Al$_2$O$_3$ molar ratio within 0.14:1.86 to 0.6:1.4, not more than 45 percent by weight of alumina material and from 8 to 20 percent by weight of alumina cement.

OPERATION

Figure 1:
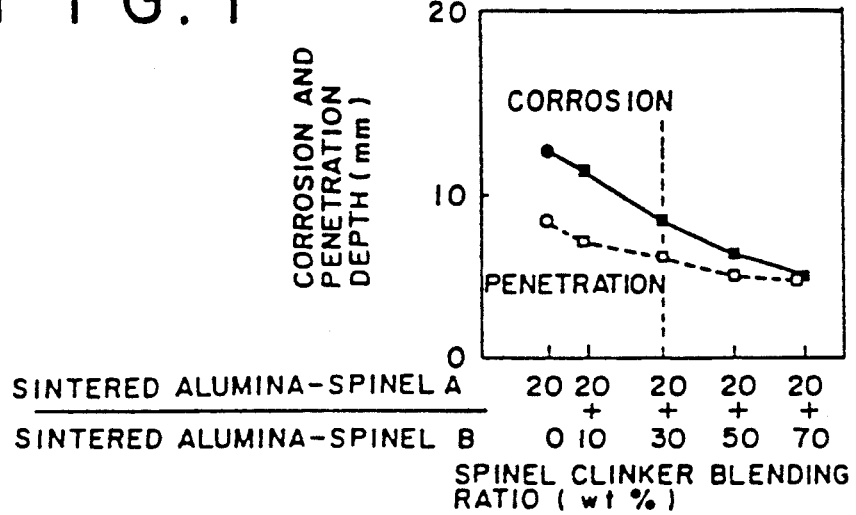
FIG. 1 is a graphical representation of a blending ratio of spinel clinkers having different MgO:Al$_2$O$_3$ molar ratios, and of the relation between corrosion resistance and slag penetration resistance.
Figure 2:
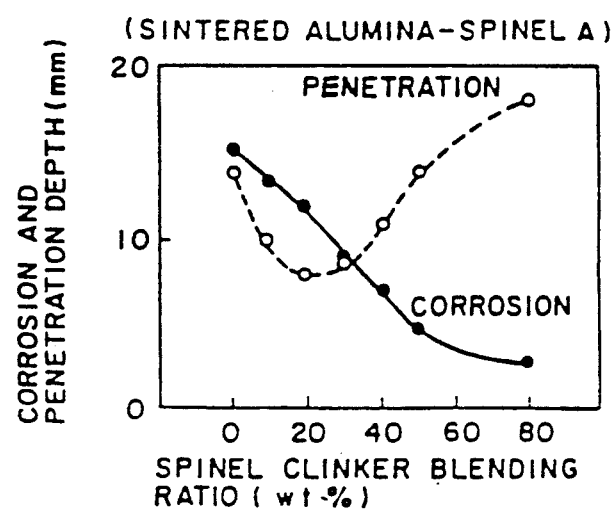
FIG. 2 is a graphical representation of a blending ratio (percent by weight) of sintered spinel A having a close to theoretical composition (MgO:Al$_2$O$_3$ molar ratio of 1.02:0.98), and the corrosion resistance and the slag penetration resistance when said sintered spinel A is singly used that is with the balance being sintered alumina and alumina cement.
Figure 3:
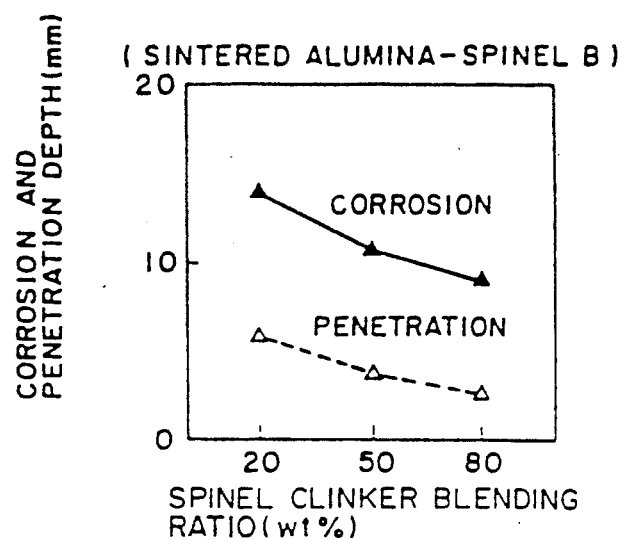
FIG. 3 is a graphical representation of a blending ratio (percent by weight) of sintered alumina-spinel B having a MgO:Al$_2$O$_3$ molar ratio of 0.44:1.56, and of the corrosion resistance and the slag penetration resistance when said sintered alumina-spinel B is singly used that is with the balance being sintered alumina and alumina cement.

The alumina-spinel type clinker used in alumina-spinel type monolithic refractory according to the present invention may be selected from one or more of electromelting spinel clinkers and sintered spinel clinkers, with said alumina-spinel type clinkers having a MgO:Al$_2$O$_3$ molar ratio within 0.14:1.86 to 0.6:1.4 that is dissolved alumina with spinel to produce a solid solution, but said clinkers may contain a small amount of corumdum.

Accordingly, it is desired that the MgO:Al$_2$O$_3$ molar ratio of an alumina-spinel type clinker using the present invention having a MgO:Al$_2$O$_3$ molar ratio of less than the theoretical composition (MgO:Al$_2$O$_3$ molar ratio of 1:1) be within the range of 0.14:1.86 to 0.6:1.4 as described above. If said MgO:Al$_2$O$_3$ molar ratio is less than 0.14:1.86, the slag penetration effect is poor, and if said MgO:Al$_2$O$_3$ molar ratio is more than 0.6:1.4, at the time of the immersion of FeO and MnO components in the slag to the monolithic refractory the expansion of the refractory is occurs by enlarging the lattice constant of spinel solid solution in said refractory, thereby increasing the slack in the texture and slag penetration of said refractory.

Also, since the coefficient of thermal expansion of the alumina-spinel type clinker using the present invention is lower than that of spinel clinker having a theoretical composition (MgO:Al$_2$O$_3$ molar ratio is 1:1), the thermal spalling resistance of the present refractories is better than that of the refractories using the spinel clinker laving theoretical composition alone.

In the first, the second and the third embodiments according to the present invention the blending amounts of said alumina-spinel type clinker range from 5 to 92 percent by weight. If said blending amount is less than 5 percent by weight, the effect of inhibiting the slag penetration of alumina-spinel clinker is small and if said amount is more than 92 percent by weight, the blending amount of alumina cement that is binder is lowered and then a drop in strength of the refractory may occur. Further, if alumina material is not added, the blending amount is preferably from 80 to 92 percent by weight in consideration of the blending amount of alumina cement as described hereinafter.

Also in the forth and fifth embodiments according to the present invention the blending amounts of alumina-spinel type clinker range from 30 to 82 percents by weight. Namely, as can be understood from the graphical representation of the relationship of the blending amount, the corrosion resistance and the slag penetration resistance shown in FIG. 1, if this blending amount is less than 30 percent by weight, a high degree of corrosion resistance can not be obtained and further, it is not preferable for the blending amount to be more than 82 percent by weight, because the blending amounts of the spinel clinker and alumina cement that are blended simultaneously can not be 10 percent and over and can not be 8 percent and over by weight respectively, and high degrees of corrosion resistance and strength can not be obtained.

In FIG. 1 sintered spinel A has a MgO:Al$_2$O$_3$ molar ratio of 1.02:0.98 and sintered alumina-spinel B has a MgO:Al$_2$O$_3$ molar ratio of 0.44:1.56.

Next, the spinel clinker used in the forth and fifth embodiments of the present invention may be either an electromelting spinel or sintered spinel or these spinels may be used together. The MgO:Al$_2$O$_3$ molar ratio of said spinel clinker ranges from 0.9:1.1 to 1.3:0.7 and the grain size that can be used is less than 1 mm. If this grain size is more than 1 mm, the excellent slag penetration resistance can not be obtained which is undesirable. Also, the blending amount of spinel clinker ranges from 10 to 40 percent by weight. It is not preferable for this blending amount to either be less than 10 percent by weight, because a high degree of corrosion resistance can not be obtained nor to be more than 40 percent by weight, because the slag penetration resistance is lowered.

Further, sintered alumina, electromelting alumina, bauxite and aluminous shale can be used as alumina materials in the present invention. However, since an increase of silica content may incur the formation of low melting point materials, the use of sintered alumina and/or electromelting alumina is desired. If bauxite and/or aluminous shale, etc. are added, they are preferably in the form of coarse grains (not less than 3 mm and not more than 10 mm).

Further, the blending amounts of alumina materials in the second and third embodiments according to the present invention, are less than 87 percent by weight. If this blending amount is more than 87 percent by weight, problems concerning slag penetrating and strength may occur since the blending amounts of spinel clinker and alumina cement are lowered.

Also, if alumina material is added in the fourth and fifth embodiments according to the present invention, the blending amount of said material is less than 45 percent by weight. That is it is not preferable that the blending amount be more than 45 percent by weight, because a high degree of corrosion resistance can not be obtained.

Alumina cement has been used in conventional castable refractories and in the present invention alumina cement is used as binder. It is preferable that the blending amount of alumina cement range from 8 to 20 percent by weight. If this blending amount is less than 8 percent by weight, the strength of the refractory is insufficient and if this amount is more than 20 percent by weight, a large amount of low melting point material is formed and corrosion resistance is lowered.

In the third embodiment of the present invention, in order to inhibit the enlargement of cracks, alumina crushed grain such as electromelting alumina, aluminous shale, alumina brick and the like having a grain size of from 10 to 50 mm can be added in a blending amount of from 10 to 40 percent by weight of the total amount of the above materials such as alumina-spinel type clinker, alumina cement and spinel clinker.

Also, in alumina-spinel type monolithic refractories according to the present invention inorganic fibers, steel fibers, setting adjunct and like can be added.

Further, as processes for applying the alumina-spinel type monolithic refractories according to the present invention, casting processes, spray gunning processes and like can be used.

EXAMPLES

In order to examplify the alumina-spinel type monolithic refractories according to the present invention, the following examples are provided.

EXAMPLE 1

In this Example, alumina-spinel type monolithic refractories related to the first, to the second and to the third embodiments are described. In Table 1, the chemical compositions of the materials used in the Working Examples and Comparative Examples are described and in Table 2, the blending ratios and properties of the monolithic refractories of the Working Examples and Comparative Examples are indicated.

TABLE 1

| Material | Component | | | | | | $MgO:Al_2O_3$ molar ratio |
|---|---|---|---|---|---|---|---|
| | $SiO_2$ | $Al_2O_3$ | $Fe_2O_3$ | $TiO_2$ | CaO | MgO | |
| Sintered Alumina | 0.1 | 99.3 | 0.1 | trace | 0.1 | 0.1 | |
| Sintered Alumina-Spinel A | 0.1 | 94.3 | 0.2 | trace | 0.3 | 5.2 | 0.24:1.76 |
| Sintered Alumina-Spinel B | 0.1 | 89.4 | 0.2 | trace | 0.3 | 10.1 | 0.44:1.56 |
| Sintered Spinel C | 0.2 | 70.3 | 0.4 | trace | 0.3 | 28.9 | 1.02:0.98 |
| Electromelting Alumina-Spinel A | 0.4 | 82.6 | 1.0 | 0.1 | 0.8 | 14.3 | 0.61:1.39 |
| Aluminous Shale | 5.9 | 87.4 | 1.0 | 4.2 | 0.2 | 0.6 | |
| Electromelting Alumina Crushed Grain | 1.0 | 94.9 | 0.8 | 3.2 | 0.3 | 0.6 | |
| Alumina Cement | 0.2 | 79.8 | 0.3 | trace | 17.5 | 0.4 | |

Each compound indicated in Table 2 was mixed with a prescribed quantity of water, then cast and formed in a metallic frame, cured for 24 hours at 20° C., and dried for 24 hours at 105° C., and thereafter the obtained refractories were tested as follows:

(1) Linear Change After Heating (at 1500° C.-3 hours): according to JIS R2555.

(2) Corrosion Test

① Equipment: Rotary drum corrosion test equipment

② Sample size: 50×200×65 mm

③ Temperature and Time:

1650° C. - 30 minutes charging the slag

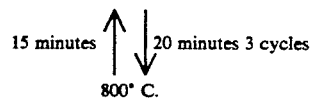

800° C.

1650° C. - 30 minutes heating

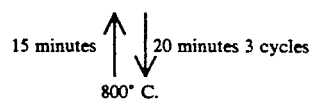

800° C.

④ Slag: LD Converter slag ($CaO/SiO_2$ = 3.65)

1.2 kg/cycle

TABLE 2

| Blending Amount (wt %) | Working Example 1 | 2 | 3 | 4 | 5 | 6 | 7 | 8 | 9 | 10 | Comparative Example 1 | 2 | 3 |
|---|---|---|---|---|---|---|---|---|---|---|---|---|---|
| Sintered Alumina (5~1 mm) | 18 | 50 | | | | | | | | | 50 | 50 | |
| Sintered Alumina (not more than 1 mm) | 50 | 25 | 8 | 40 | 40 | | | 50 | 50 | 40 | 18 | 35 | 14 |
| Sintered Alumina-Spinel A (5~1 mm) | 20 | | | 8 | 20 | | | 18 | 18 | 8 | | | |
| Sintered Alumina-Spinel A (not more than 1 mm) | | | | | | | | | | | | | |
| Sintered Alumina-Spinel B (5~1 mm) | | 10 | 50 | | | 50 | 50 | | | | | | 50 |
| Sintered Alumina-Spinel B (not more than 1 mm) | | | 30 | 30 | | 38 | 38 | 20 | 20 | 30 | | | 30 |
| Sintered Spinel C (not more than 1 mm) | | | | | | | | | | | 20 | | |
| Erectromelting Alumina-Spinel A (5~1 mm) | | | | | 10 | | | | | | | | |
| Erectromelting Alumina-Spinel A (not more than 1 mm) | | | | | 20 | | | | | | | | 3 |
| Aluminous Shale (5~1 mm) | | | | 10 | | | | | | 10 | | | |
| Alumina Cement | 12 | 15 | 12 | 12 | 10 | 12 | 12 | 12 | 12 | 12 | 12 | 12 | 6 |
| Erectromelting Alumina Crushed grain (20~30 mm) | +20 | +30 | +25 | +20 | | +25 | | | +30 | | +20 | +20 | +20 |
| Added Water | 5.0 | 5.0 | 5.0 | 5.5 | 6.5 | 5.0 | 6.0 | 6.0 | 5.0 | 6.5 | 5.0 | 5.0 | 5.0 |
| Test Result | | | | | | | | | | | | | |
| Linear Change (%) at 1500° C.-3 hours | +0.03 | 0.00 | −0.03 | 0.00 | −0.03 | −0.03 | −0.03 | +0.03 | 0.00 | −0.03 | +0.06 | 0.00 | 0.00 |
| Corrosion Resistance | | | | | | | | | | | | | |
| Index of Corrosion Depth | 125 | 120 | 105 | 130 | 90 | 100 | 100 | 120 | 110 | 135 | 100 | 130 | 80 |
| Index of slag Penetration Depth | 60 | 55 | 45 | 65 | 55 | 50 | 45 | 50 | 55 | 60 | 100 | 155 | 140 |
| Spalling Resistance (*) | ⊙ | ⊙ | ⊙ | ⊙ | ○ | ⊙ | ○ | ○ | ⊙ | ○ | △ | ⊙ | △ |

Spalling Test (*): Test Method = Panel Spalling Method; Sample Size = 65 × 114 × 230 mm
Temperature and Time = Heating 1500° C.-30 min. ↔ Standing and Cooling 30 min. × 10 cycles.
⊙ = a small number of cracks, ○ = a number of cracks, △ = a great number of cracks

EXAMPLE 2

In this Example, alumina-spinel type monolithic refractories related to the fourth and to the fifth embodiments are described. In Table 3, the chemical compositions of the materials used in the Working Examples and Comparative Examples are described and in Table 4, the blending ratio and properties of the monolithic refractories of the Working Examples and Comparative Examples are indicated.

TABLE 3

| Material | Component | | | | | MgO:$Al_2O_3$ molar ratio |
|---|---|---|---|---|---|---|
| | $SiO_2$ | $Al_2O_3$ | $Fe_2O_3$ | CaO | MgO | |
| Sintered Alumina | 0.1 | 99.3 | 0.1 | 0.1 | 0.1 | |
| Electromelting Alumina | 0.1 | 99.5 | 0.1 | 0.1 | 0.1 | |
| Sintered Spinel D | 0.2 | 70.5 | 0.2 | 0.3 | 28.9 | 1.02:0.98 |
| Sintered Alumina-Spinel B | 0.1 | 89.4 | 0.2 | 0.3 | 10.1 | 0.44:1.56 |
| Electromelting Alumina-Spinel E | 0.4 | 82.6 | 0.2 | 0.8 | 14.3 | 0.60:1.40 |
| Alumina Cement | 0.2 | 79.8 | 0.2 | 17.7 | 0.4 | |

Each compound indicated in Table 4 was mixed with a prescribed quantity of water, then cast and formed in a metallic frame, cured for 24 hours at 20° C., and dried for 24 hours at 105° C., and thereafter the obtained refractories were tested as follows:

Corrosion Test
① Equipment: Rotary drum corrosion test equipment
② Sample size: 50×200×65 mm
③ Temperature and Time: 1650° C.—4 hours
④ Slag: LD Converter slag

TABLE 4

| | Working Example | | | | | | | Comparative Example | | | | | | |
|---|---|---|---|---|---|---|---|---|---|---|---|---|---|---|
| | 11 | 12 | 13 | 14 | 15 | 16 | 17 | 4 | 5 | 6 | 7 | 8 | 9 | 10 |
| Blending Amount (wt %) | | | | | | | | | | | | | | |
| Sintered Alumina | 40 | 20 | | | 20 | 20 | | 40 | 40 | 70 | 40 | 10 | 10 | 90 |
| Erectromelting Alumina | | | | | | | 20 | | | | | | | |
| Sintered Spinel D (not more than 1 mm) | 20 | 20 | 20 | 10 | 40 | 20 | 20 | | 40 | 20 | | | 40 | |
| Sintered Alumina-Spinel D (5~1 mm) | | | | | | | | 20 | 10 | | | | 40 | |
| Sintered Alumina-Spinel B | 30 | 50 | 70 | 80 | 30 | | 50 | 30 | | | 50 | 80 | | |
| Erectromelting Alumina-Spinel E | | | | | | 50 | | | | | | | | |
| Alumina Cement | 10 | 10 | 10 | 10 | 10 | 10 | 10 | 10 | 10 | 10 | 10 | 10 | 10 | 10 |
| Properties | | | | | | | | | | | | | | |
| Corrosion Test Result Corrosion Depth (mm) | 8 | 6 | 4.5 | 6 | 5 | 5 | 5.5 | 11 | 4.5 | 12 | 10.5 | 9 | 3 | 15 |
| Penetration Depth (mm) | 6 | 5 | 4.5 | 4 | 8 | 6 | 5.5 | 9 | 14 | 8 | 4 | 3 | 18 | 14 |

ADVANTAGEOUS EFFECT OF THE INVENTION

The alumina-spinel type monolithic refractories according to the first, to the second and to the third embodiments of the present invention have good spalling resistance by inhibiting slag penetration in comparison with conventional alumina-spinel type monolithic refractories, because the MgO content in the spinel material is selected.

Also, the alumina-spinel type monolithic refractories according to the fourth and the fifth embodiments of the present invention have both good slag penetration resistance and corrosion resistance, whereby durability can be significantly improved in lining refractories for ladles and like that are used under more severe service conditions and an excellent effect in the decrease of the cost of refractory can be obtained.

As described above, according to the alumina-spinel type monolithic refractories of the present invention, a monolithic refractory having less cracking and spalling can be provided, which is a material that can obtain stabilized high durability.

We claim:

1. A monolithic refractory containing an alumina-spinel clinker characterized in that said refractory consists essentially of
   (a) from 80 to 92 percent by weight of an alumina-spinel clinker having a MgO:$Al_2O_3$ molar ratio ranging from 0.14:1.86 to 0.6:1.4, and
   (b) from 8 to 20 percent by weight of alumina cement.

2. A monolithic refractory containing an alumina-spinel clinker characterized in that said refractory consists essentially of
   (a) from 5 to 92 percent by weight of an alumina-spinel clinker having a MgO:$Al_2O_3$ molar ratio ranging from 0.14:1.86 to 0.6:1.4,
   (b) from 8 to 20 percent by weight of alumina cement, and
   (c) not more than 87 percent by weight of alumina material.

3. A monolithic refractory containing an alumina-spinel clinker characterized in that said refractory consists essentially of
   (A) a mixture of 100 parts by weight which comprises
      a) 5 to 92 percent by weight of an alumina-spinel clinker having a MgO:$Al_2O_3$ molar ratio ranging from 0.14:1.86 to 0.6:1.4,
      b) from 8 to 20 percent by weight of alumina cement, and
      c) not more than 87 percent by weight of alumina material, and
   B) from 10 to 40 parts by weight of alumina crushed grain having a grain size of 10 to 50 mm.

4. A monolithic refractory containing an alumina-spinel clinker characterized in that said refractory consists essentially of
   a) from 30 to 82 percent by weight of an alumina-spinel clinker having a MgO:$Al_2O_3$ molar ratio ranging from 0.14:1.86 to 0.6:1.4,
   b) from 8 to 20 percent by weight of alumina cement, c) from 10 to 40 percent by weight of spinel clinker having a $MgO:Al_2O_3$ molar ratio ranging from 0.9:1.1 to 1.3:0.7 and a grain size of not more than 1 mm.

5. A monolithic refractory containing an alumina-spinel clinker characterized in that said refractory consists essentially of a) from 30 to 82 percent by weight of alumina-spinel clinker having a $MgO:Al_2O_3$ molar ratio ranging from 0.14:1.86 to 0.6:1.4,
b) from 8 to 20 percent by weight of alumina cement,
c) not more than 45 percent by weight of alumina material, and
d) from 10 to 40 percent by weight of spinel clinker having a $MgO:Al_2O_3$ molar ratio ranging from 0.9:1.1 to 1.3:0.7 and a grain size of not more than 1 mm.

* * * * *